US012476385B2

(12) United States Patent
Mazur

(10) Patent No.: US 12,476,385 B2
(45) Date of Patent: Nov. 18, 2025

(54) MODIFIED RADAR ANTENNA ARRAY

(71) Applicant: Carrier Corporation, Palm Beach Gardens, FL (US)

(72) Inventor: Mateusz Mazur, Sopot (PL)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 182 days.

(21) Appl. No.: 18/448,129

(22) Filed: Aug. 10, 2023

(65) Prior Publication Data

US 2024/0113445 A1 Apr. 4, 2024

Related U.S. Application Data

(60) Provisional application No. 63/373,500, filed on Aug. 25, 2022.

(51) Int. Cl.
*H01Q 21/06* (2006.01)
*H01Q 9/04* (2006.01)

(52) U.S. Cl.
CPC ......... *H01Q 21/065* (2013.01); *H01Q 9/0407* (2013.01)

(58) Field of Classification Search
CPC ...... H01Q 21/065; H01Q 9/0407; H01Q 1/48; H01Q 21/08
See application file for complete search history.

(56) References Cited

U.S. PATENT DOCUMENTS

| | | | | |
|---|---|---|---|---|
| 10,249,953 | B2 * | 4/2019 | Ng | H01Q 1/286 |
| 2015/0069134 | A1 * | 3/2015 | Westrick | H01Q 9/0407 343/843 |
| 2018/0183148 | A1 * | 6/2018 | Pan | H01Q 9/0421 |
| 2021/0367343 | A1 * | 11/2021 | Mak | H01Q 9/0407 |

OTHER PUBLICATIONS

Samantaray et al. "A Gain Enhanced Multiband Antenna using SRRs with Defected Ground Structure", 4 pages, Mar. 2019 (Year: 2019).*
Sabapathy, "A Ground-Plane-Truncated Broadly Steerable YagiUda Patch Array Antenna", pp. 1069-1072, 2016 (Year: 2016).*

* cited by examiner

*Primary Examiner* — Daniel D Chang
(74) *Attorney, Agent, or Firm* — CANTOR COLBURN LLP

(57) ABSTRACT

A patch antenna comprises a radiating microstrip patch element; and a ground layer electromagnetically connected to the patch element, wherein the ground layer is configured such that a radiation pattern of the patch antenna comprises a beam perpendicular to the antenna aperture, and a sub-beam parallel to the antenna aperture.

12 Claims, 4 Drawing Sheets

STANDARD SOLUTION WHERE END-FIRE DIRECTION SIDELOBE CARRY MINOR AMOUNT OF ENERGY OR DOESN'T EXIST

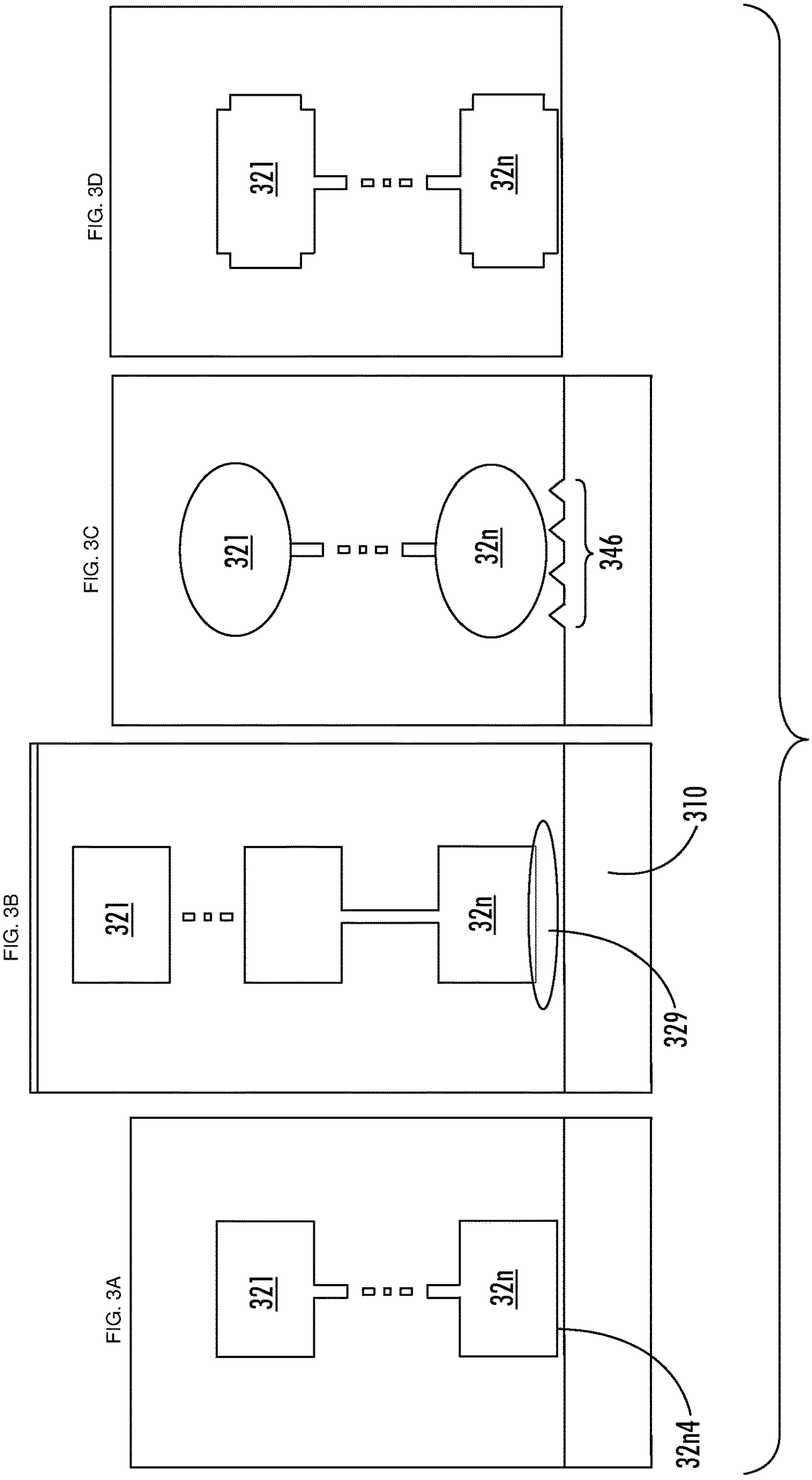
FIG. 3 A-D

MODIFIED RADAR ANTENNA ARRAY

CROSS-REFERENCE TO RELATED APPLICATION

This patent application claims the benefit of priority of U.S. Provisional Patent Application No. 63/373,500, filed on Aug. 25, 2022.

TECHNICAL FIELD

The invention relates generally to antenna arrays and, more specifically, to patch antenna having a modified ground layer.

BACKGROUND

High antenna gain, generally, helps achieve long radar range. However, this usually results in a limited amount of radiated/received energy under the antenna. This means that under the radar, a weak or no signal may be observed. Because of this, conventional patch antenna arrays, used in high frequency radars, may not be able to detect presence under the radar.

BRIEF DESCRIPTION

Aspects of the disclosure relate to methods, apparatuses, and/or systems for a patch antenna.

In some embodiments, a patch antenna comprises a radiating microstrip patch element with ground layer wherein the ground layer is configured such that a radiation pattern of the patch antenna comprises a beam perpendicular to the antenna aperture, and a sub-beam parallel to the antenna aperture.

In some embodiments, a bottom edge of the ground layer corresponds to a bottom edge of the patch element.

In some embodiments, the ground layer comprises one or more cut-outs near a bottom edge of the ground layer, the one or more cut-outs configured to generate distortion in the radiation pattern.

In some embodiments, the patch antenna comprises a dielectric substrate disposed between the antenna and the ground layer, and wherein the ground layer has a same length as the dielectric substrate.

In some embodiments, the ground layer is configured such that the radiation pattern of the patch antenna is reflected by objects located under the antenna.

In some embodiments, a shape of the patch element is a rectangle, a circle, an ellipse, polygon and/or a combination thereof.

In some embodiments, the antenna is configured to operate at a frequency band between 0.4 GHz and 135 GHz.

In some embodiments, an antenna array comprises two or more radiating microstrip patch elements with a ground layer, wherein the ground layer is configured such that an area of the ground layer near a last radiating patch element is configured to emit (receive) a portion of energy directed to (from) a location under the antenna array.

In some embodiments, the antenna array comprises a dielectric substrate disposed between the antenna and the ground layer, and the ground layer is shorter in length than the dielectric substrate.

In some embodiments, a radar sensor comprises the antenna array, and the radar sensor is configured for detecting presence under the radar.

In some embodiments, the radar sensor is configured to detect crawling under the radar.

In some embodiments, a method for transmitting or receiving a portion of energy under an antenna using the patch antenna described herein.

Various other aspects, features, and advantages of the invention will be apparent through the detailed description of the invention and the drawings attached hereto. It is also to be understood that both the foregoing general description and the following detailed description are examples and not restrictive of the scope of the invention.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way.

FIGS. 3A-D show examples of patch antennas, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
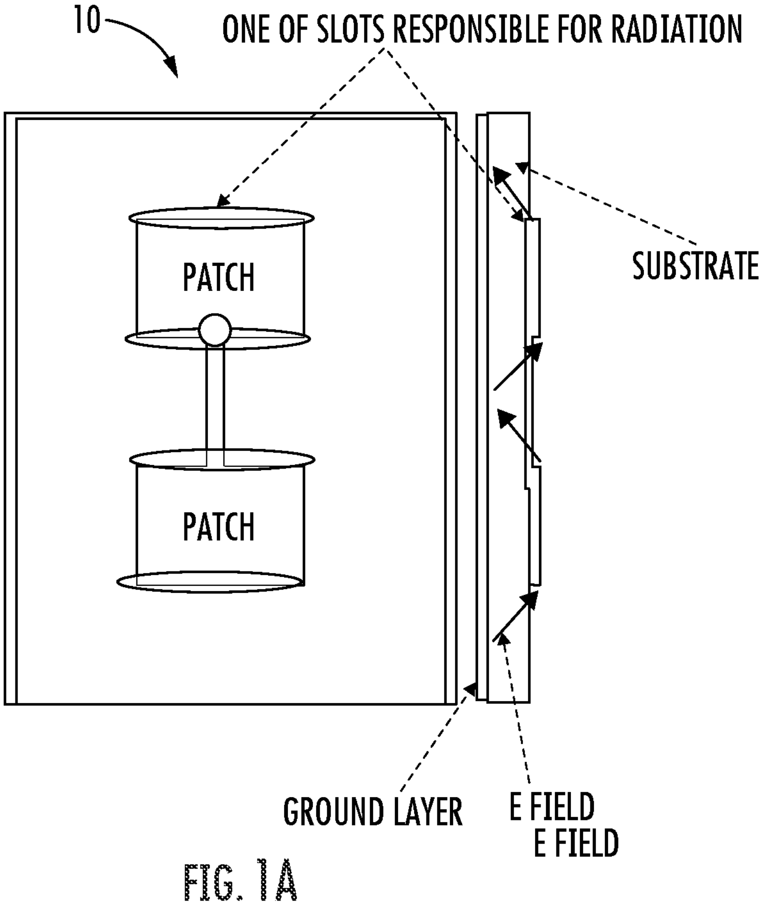
FIGS. 1A-B show an example of an existing patch antenna, in accordance with one or more embodiments
Figure 1B:
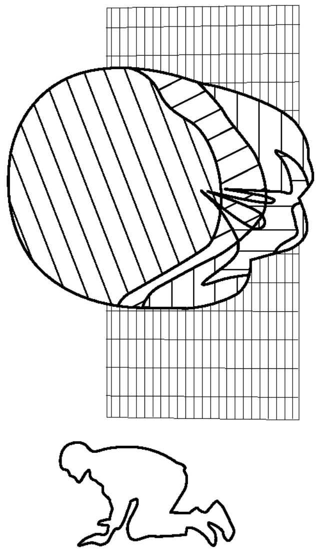

The disclosure, in accordance with some embodiments, describes a patch antenna. Generally, an antenna's gain has an important impact on the radar's range. Having a high gain is generally corelated with a narrow beam. The narrow antenna beam, in elevation, allows transmission/reception of a majority of the energy in/from the front of the antenna (boresight direction). However, these antennas have a weak or no signal under the antenna (end-fire direction). Existing standard patch antenna arrays used in high frequency radars, have limited or no performance in detection under the radar (e.g., detection of objects, humans, animals, movement, crawling, etc.). FIGS. 1A-1B show an example of operation of an existing antenna 10. As can be seen, the ground layer covers the back of the substrate. The radiation results from fringing electric fields along slots created by gaps between edges of the patches and ground. The resulting radiation pattern in this configuration has a boresight direction main-lobe and a minor amount of energy on the end-fire direction (as can be seen in FIG. 1-B).

As will be described herein, in some embodiments, the patch antenna may be configured for generating a radiation pattern including a boresight beam and an end fire beam for detecting presence under the antenna (or under a radar sensor that includes the patch antenna). The antenna's operation is based on radiation from a slot created between a radiation patch edge and the ground layer. In some embodiments, the patch antenna may include a modified ground layer configured for generating a beam under the antenna (end-fire direction). For example, the ground layer near the bottom edge of the patch may be modified to shape the radiation pattern with an additional beam (or sub-beam) directed parallelly to the antenna aperture in the end-fire direction.

In some embodiments, an antenna array (e.g., of a radar sensor) may include one or more radiation patches as described herein. In these cases, operation of the antenna array may be based on radiation from slots created between edges of the radiation patches and the ground layer. In some embodiments, the ground area near the last slot of the last radiation patch (e.g., the bottom slot created between the bottom edge of the last patch and the ground layer) may be modified to shape the antenna array's radiation pattern with an additional sub-beam directed parallelly to the antenna aperture (end-fire direction). In some embodiments, modifications the ground area (near the bottom edge and/or near the last slot) may include modifying a length of the ground layer, introducing distortion by modifying the shape of the ground layer, between the radiation patch and the ground layer), and/or other modifications to generate a sub-beam under the antenna.

Modifying the ground layer of the antenna may help extend the field of view (FoV) of the radar under the sensor (e.g., for presence detection). In addition, modifying the ground level may provide radiation power (sub-beam) in the end-fire direction with negligeable impact on the boresight radiation and the range of a system.

Figure 1C:
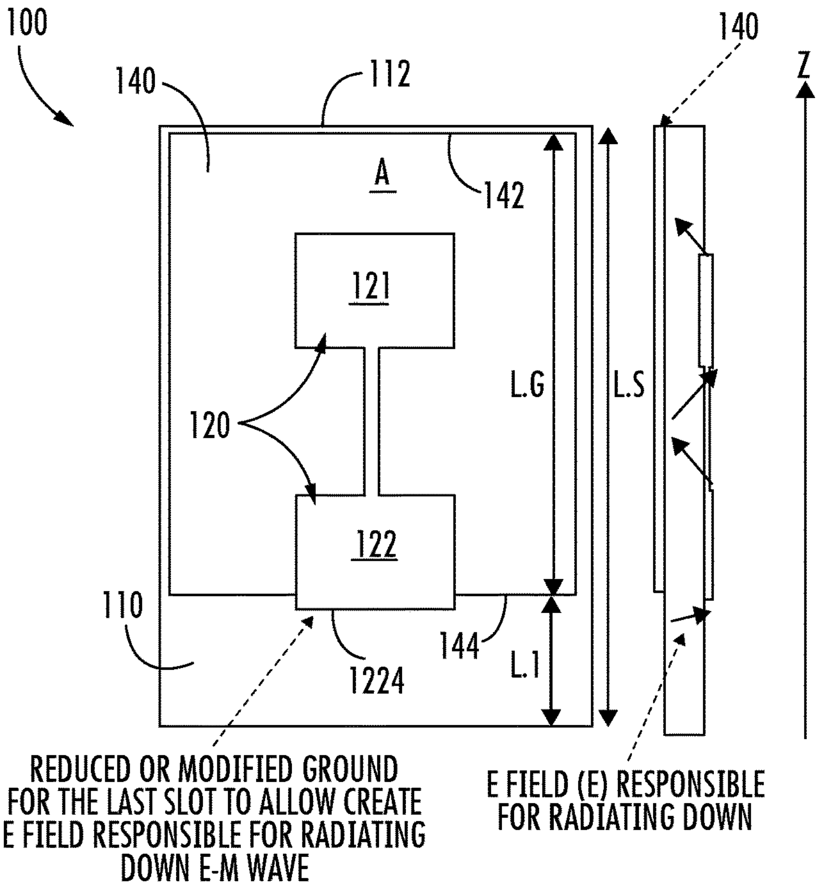
FIGS. 1C-D shows an exemplary patch antenna, in accordance with one or more embodiments.
Figure 1D:
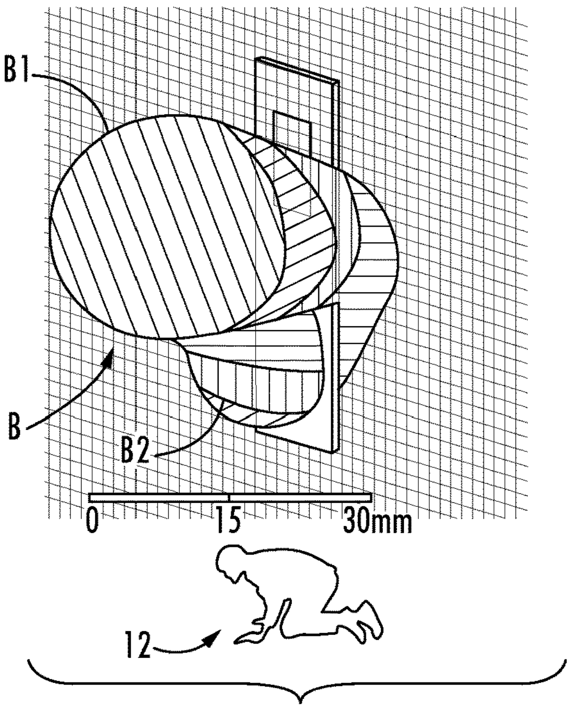

FIGS. 1C-1D are schematic depictions of an example of a patch antenna in accordance with one or more embodiments. Antenna 100 may include one or more radiating microstrip patch element (or patch) 120, a ground layer 140, and a dielectric substrate 110 disposed between patches 120 and ground layer 140. In some embodiments, a patch 120 may be etched on trace metal disposed on the surface of dielectric substrate 110. In some embodiments, patch 120 may be rectangular, circular, triangular, elliptical, poligonal or any combination thereof (e.g., patches 120 may be of any continuous geometric shape). FIGS. 1C-1D show an antenna 100 having two patches 121 and 122. It's to be understood that the antennas described herein are for illustrative purposes only, other antenna configurations may be considered and are consistent with the present disclosure (e.g., as explained herein below in some embodiments, antenna 100 may consist of one patch or multiple patches).

A ground layer 140 may be disposed on the back of substrate 110. In some embodiments, ground layer 140 may be formed by a continuous metal layer bonded to an area on the back of substrate 110. In some embodiments, ground layer 140 may be configured to cover area (A) on the of substrate 110. As shown in FIG. 1C, area (A) is smaller than the back area of substrate 110. In other words, ground layer 140 does not cover the whole back of the substrate. In some embodiments, ground layer 140 may be configured such that a top edge 142 of the ground layer corresponds to about a top edge 112 of substrate 110, and a bottom edge 144 of ground layer 140 is near a bottom edge 1224 of the last patch 120. In some embodiments, ground layer 140 may have a length L.G and substrate 110 a length L.S. The length L.G of the ground layer is configured to be shorter than the length L.S of the substrate (e.g., by a L.1) In some emdiments, ground layer L.G may be determined based on the operating frequency of the antenna, electrical parameters of substrate 110, and/or the number of antennas. For example, in some embodiments, L.G may be between about few millimiters (mm) and 1 centimeter (cm) for a two patch antenna array working at 125 GHz. In some embodiments, L.G may be about 0.6 mm for a two patch antenna array operating at 0.4 GHz Ground layer 140 may be configured such that a radiation pattern of antenna 100 comprises a beam perpendicular to the antenna aperture (along axis (Z)) of patches 120, and a beam parallel to the antenna aperture perpendicular axis (Z)). For example, bottom edge 144 of ground layer 140 near bottom edge 1224 (last slot) may be configured for generating an end-fire beam (perpendicular to Z) for detecting presence under the antenna. In some embodiments, the radiation pattern of antenna may be reflected by a presence located under antenna 100 (e.g., objects, humans, animals, movement, crawling, etc.). In operation, by modifying the ground layer 140, the resulting electrical field (E) at edge 1224 shapes the radiation pattern down, which results in an additional beam (or sub-beam) in the end-fire direction. FIG. 1D illustrates an example of the radiation pattern B including the end-fire beam B2 (in addition to boresight beam). As can be seen, the resulting radiation pattern may help in detecting presence under the sensor array (e.g., person 12 crawling).

Figure 2A:
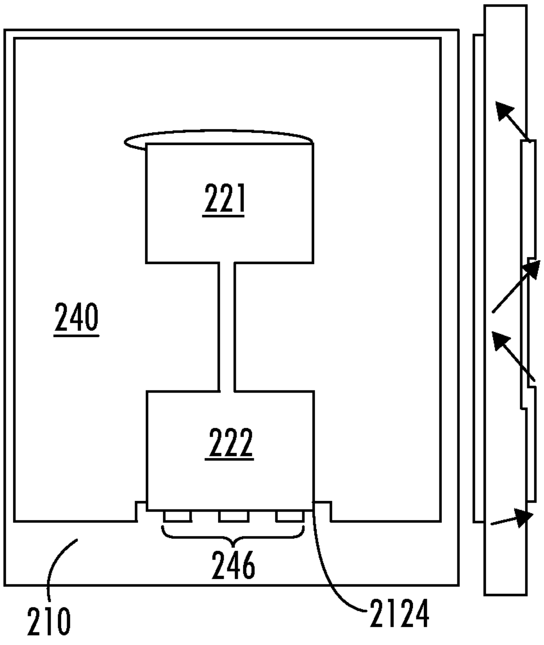
FIGS. 2A-C is show examples of patch antennas, in accordance with one or more embodiments.
Figure 2B:
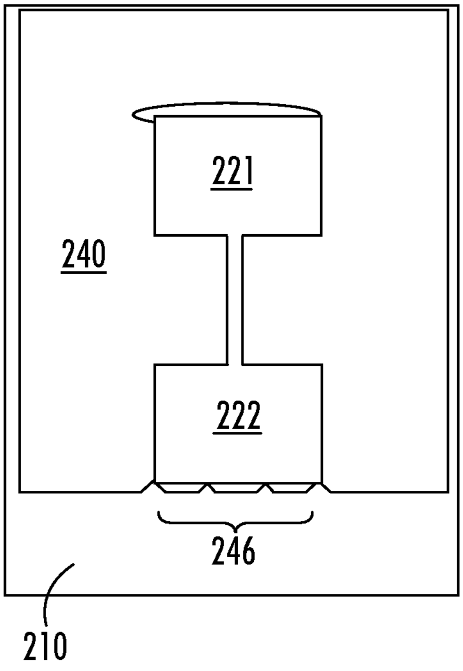
Figure 2C:
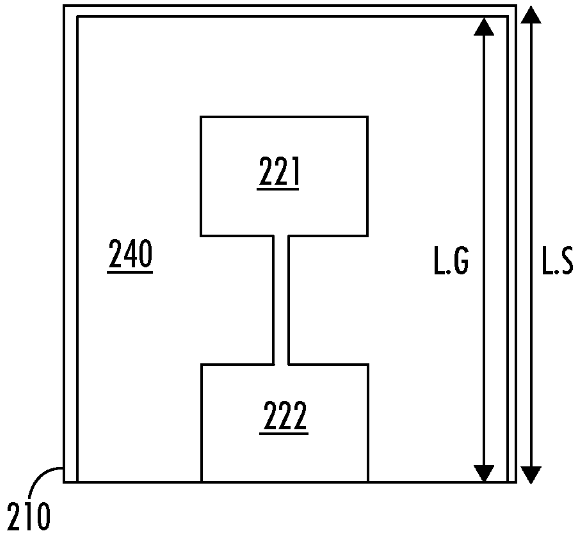

In some embodiments, the ground layer 140 may be modified to introduce distortion to the radiation pattern. The distortion introduced by the modification of the ground layer 140 may result in shaping the radiation pattern with an additional beam directed parallelly to the antenna aperture in the end-fire direction (in addition to the boresight direction beam). FIGS. 2A-C show examples of modifications to the ground layer, in accordance with one or more embodiments. For example, ground layer 240 in FIGS. 2-A-B includes one or more cut-out areas 246. Areas 246 are configured to distort radiation from the last patch 220 to form a beam directed under the antenna. Cut-out areas 246 may include one or more cut-out located near the bottom edge 2124 of the last patch 222. In some embodiments, cut-out areas may be of different shapes and sizes (e.g., rectangular, triangular, circular, elliptical, polygonal, etc.).

In some embodiments, substrate 210 may be configured to have a same length as the ground layer which corresponds to the bottom edge of the last patch. This may help shape the resulting pattern and create a beam directed in the fire-end direction. FIG. 2C, shows an example of a substrate 210 having a same length L.S as the length L.G of the ground layer 240.

In some embodiments, the patch antenna (or antenna array), described herein, may operate at a relatively high frequency band. For example, the patch antenna may operate at a frequency between about 0.4 GHz and 135 GHz. This may help extend the field of view of the radar under the sensor without sacrificing boresight radiation and the range of the radar.

FIG. 3A-D show examples of antenna arrays in accordance with one or more embodiments. In some embodiments, the antenna array may include one or more radiation patches (321-**32*n*). In these cases, ground layer 340 may extend from top edge 312 of substrate 110 to an area near the bottom edge 32*n*4 of the last patch. Antenna array 300 may be configured to create radiation from slots 329 created between edges of the radiation patches 32*n* and the ground layer 340. In some embodiments, the ground area near the last slot in the last radiation patch (e.g., the bottom slot created between the bottom edge of the last patch and the ground layer) may be modified to shape the antenna array's radiation pattern with an additional sub-beam directed in the end-fire direction. In some embodiments, modification of the ground layer (near the last slot) may include introducing distortion by modifying the shape of the ground layer (cut-outs 346), and/or modifying the length L.S of dielectric substrate 310**.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every.

What is claimed is:

1. A patch antenna comprising:

a radiating microstrip patch element; and a ground layer corresponding to the patch element, wherein the ground layer comprises one or more cut-outs near a bottom edge of the ground layer, the one or more cutouts configured to generate distortion in a radiation pattern of the patch antenna, such that the radiation pattern of the patch antenna comprises a beam perpendicular to an antenna aperture, and a sub-beam parallel to the antenna aperture.

2. The patch antenna of claim 1, wherein the bottom edge of the ground layer corresponds to a bottom edge of the patch element.

3. The patch antenna of claim 2, further comprising:

a dielectric substrate disposed between the antenna and the ground layer, and wherein the ground layer has a same length as the dielectric substrate.

4. The patch antenna of claim 2, wherein the ground layer is configured such that the radiation pattern of the patch antenna is reflected by objects located under the antenna.

5. The patch antenna of claim 1, wherein a shape of the patch element is a rectangle, a circle, an ellipse, polygon, and/or a combination thereof.

6. The patch antenna of claim 1, wherein the antenna is configured to operate at a frequency between 0.4 GHz and 135 GHz.

7. A method for generating a beam directed under a patch antenna using the patch antenna of claim 1.

8. The patch antenna of claim 1, wherein the one or more cut-outs have a shape selected from the group consisting of rectangular, triangular, circular, elliptical, or polygonal shapes, the one or more cut-outs being positioned adjacent to a bottom edge of the patch element and extending into the ground layer from the bottom edge, the one or more cut-outs configured to generate the distortion in the radiation pattern by directing a portion of the radiated energy in an end-fire direction parallel to the antenna aperture.

9. An antenna array comprising:

two or more radiating microstrip patch elements with a ground layer, wherein the ground layer is configured such that an area of the ground layer near a last radiating patch element is configured to shape an antenna pattern with an additional beam directed to a location under the antenna array;

the ground layer comprises one or more cut-outs near a bottom edge of the ground layer, to distort radiation from the last radiating patch element, such that a radiation pattern of the antenna array comprises a beam perpendicular to an antenna aperture, and a sub-beam parallel to the antenna aperture.

10. The antenna array of claim 9, further comprising:

a dielectric substrate disposed between the antenna and the ground layer, and wherein the ground layer is shorter in length than the dielectric substrate.

11. A radar sensor comprising the antenna array of claim 9, wherein the radar sensor is configured for detecting presence under the radar.

12. The radar sensor of claim 11, wherein the radar sensor is configured to detect crawling under the radar.

* * * * *